(No Model.)

S. G. STEVENS.
REVOLVING GATE.

No. 603,212. Patented Apr. 26, 1898.

Witnesses.
J. P. Coleman
Archie P. Reese

Inventor
Sylvester G. Stevens
by Frank L. Dyer
Att'y.

UNITED STATES PATENT OFFICE.

SYLVESTER GEORGE STEVENS, OF LINCOLN, NEW YORK.

REVOLVING GATE.

SPECIFICATION forming part of Letters Patent No. 603,212, dated April 26, 1898.

Application filed October 13, 1897. Serial No. 655,065. (No model.)

*To all whom it may concern:*

Be it known that I, SYLVESTER GEORGE STEVENS, a citizen of the United States, residing at Lincoln, in the county of Wayne and State of New York, have invented certain new and useful Improvements in Revolving Gates; and I do hereby declare the following to be a full, clear, and exact description of the invention, which will enable others skilled in the art to which it appertains to make and use the same.

My invention relates to various new and useful improvements in farm-gates.

The objects of my invention are to provide and produce a gate for the purpose which shall be cheap to construct, easy to operate, durable in use, and which will possess other advantages, which will be more particularly pointed out.

Broadly considered my invention comprises a gate having one or more hoops or wheels rigidly connected therewith in such a way that in the operations of opening and closing the gate the latter will rotate with the wheel or hoop to which it is connected. Preferably the said wheel or hoop, which is at least equal in diameter to the height of the gate, is secured at the forward end thereof, the other end being connected to a suitable post by a universal joint, which permits of the swinging movement necessary in all gates and of the rotary movement necessary in my improved gate. The said hoop may, however, be secured at a central point on the gate to serve the same purpose, or there may be a hoop or wheel at both ends of the gate, so that the gate instead of swinging, as is common, would be rolled directly back toward the opening to be closed thereby or away therefrom; and my invention comprises the several modifications which I have referred to.

Preferably, also, my improved gate is so constructed that it will automatically maintain itself in a closed position, which result may be effected in a variety of ways, as will be explained.

In order that my invention may be better understood, attention is directed to the accompanying drawings, forming a part of this specification, and in which—

Figure 1:
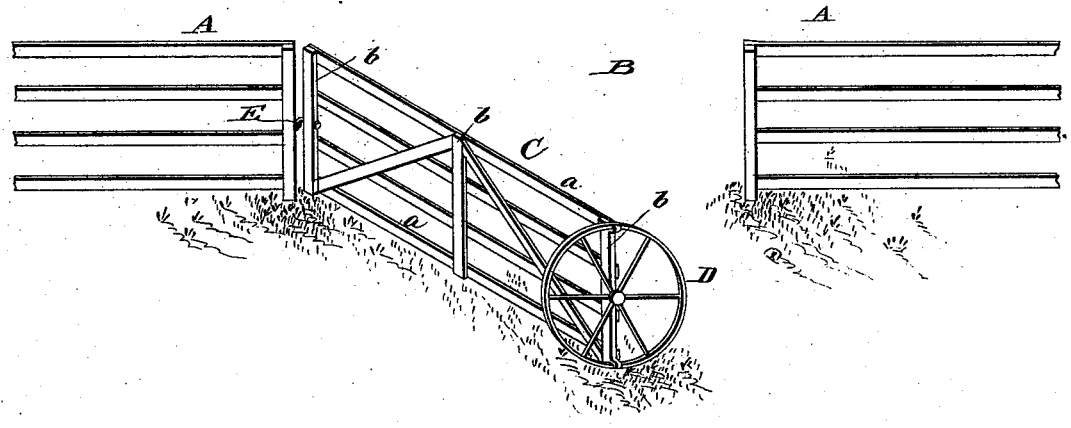
Figure 2:
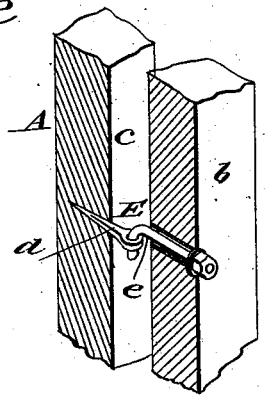
Figure 3:
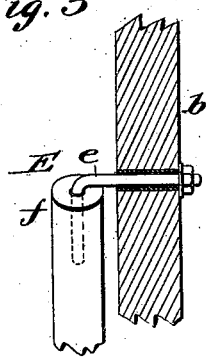
Figure 4:
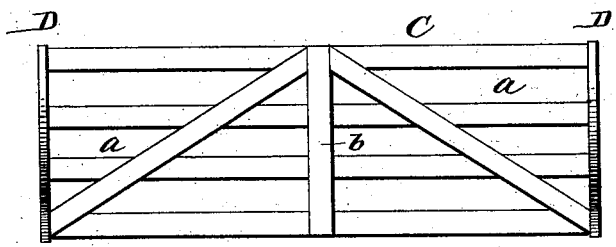

Figure 1 is a perspective view of a portion of the fence, showing my improved gate in connection therewith, the latter being illustrated as being partially opened; Fig. 2, a perspective view, partially in section, of the preferred form of hinge for the gate; Fig. 3, a corresponding view of a modified form of hinge. Fig. 4 is a side elevation of a portable gate provided with a hoop or wheel at each end, and Fig. 5 an end view thereof.

In all the above views corresponding parts are represented by the same letters of reference.

A A represent a portion of an ordinary fence having the opening B, which is adapted to be controlled by the gate C. The said gate may be of the construction illustrated, comprising the horizontal members $a\ a$ and the vertical members $b\ b$; but the said gate may be of a variety of forms, and I do not wish to be limited to any particular form.

Preferably the gate is provided at its outer end with a wheel D, which is shown as being of a diameter equal substantially to the height of the gate, but which may be of a slightly larger diameter, if necessary.

In the special type of my invention illustrated the gate C moves upon a hinge E, and in Figs. 2 and 3 I illustrate convenient forms of hinges for this purpose.

Referring to Fig. 2, $c$ represents an upright post comprising a portion of the fence, and $b$ the vertical member of the gate adjacent to said post. An eye or staple $d$ is driven into the post $c$, or it may extend entirely through the same, and a hook or anchor-piece $e$ is passed through the vertical member $b$ and engages with said eye or staple. The said hook or anchor member $e$ is provided with a nut at its inner end, and it turns loosely within the member $b$, whereby upon opening the gate the latter will rotate with the wheel D and the member $b$ in Fig. 2 will turn upon the hook or anchor member $e$. In Fig. 3 a similar hinge is shown, except that the hook $e$ engages a socket or an opening formed in the top of a short post $f$, which is of a height equal substantially to half that of the gate.

Figure 5:
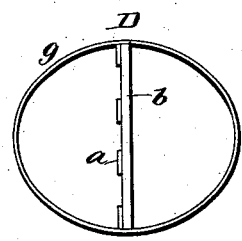

The wheel D may be of any suitable construction; but in Fig. 5 I illustrate the construction which I prefer to adopt and which comprises simply a rim $g$, made of hoop-iron and secured to the top and bottom of the gate in any suitable way. If desired, the rim $g$ may be strengthened by braces arranged in any desired manner; but I do not consider that any braces are strictly necessary. It will also be possible and within the skill of any mechanic to arrange the hoops so that they may be turned so as to extend substantially parallel or in line with the gate when it is closed or during shipment.

As stated, it is possible to provide each end of the gate with the wheel D, as shown in Fig. 4, in which case the hinge or pivot e will be dispensed with and the gate will be moved back and forth from the opening B. It is also to be understood that instead of providing the wheel D at the outer end of the gate the said wheel may be secured to the gate at a central point thereof and will operate in the same way.

The principal advantages of my improvement are the simplicity and cheapness of the device. A further advantage is that the gate may be operated very easily and will not be obstructed by stones, snow, or other obstacles, as with an ordinary gate.

A still further advantage is that it is impossible for my improved gate to be opened by animals, since in rotating the lower bar will be moved toward the front legs of the animal and further motion thereof will be arrested, and a final advantage with my improved gate is that it may be used for separating cattle or horses from smaller animals, such as sheep or hogs, by placing the gate in a horizontal position, so as to allow the smaller animals to pass beneath the same.

Preferably my improved gate is so arranged that it will retain its closed position automatically, and this may be effected in a variety of ways. For instance, the hinge or pivot e may be placed a short distance above the center of the gate, so that the lower portion will overbalance the upper portion thereof, in which case if the gate is not opened more than a half-revolution of the wheel D it will automatically close. The same result will be effected if a counterbalance-weight is secured to the under side of the gate; or instead of either of these constructions the ground over which the wheel D revolves may be graded, so as to offer a decline toward the fence A, whereby the gate if opened to one side or the other and to any extent will be automatically closed and will retain its closed position. However, I prefer to effect the automatic closing of the gate by making the normal vertical axis of the hoop or wheel D less than its horizontal axis—in other words, making the said hoop elliptical—whereby it will automatically assume the position shown in Fig. 5 to close the gate and keep it closed.

Having now described my invention, what I claim as new therein, and desire to secure by Letters Patent, is as follows:

1. An improved farm-gate having a wheel secured thereto of a diameter equal at least to the height of the gate, whereby in operation the gate will rotate with said wheel, substantially as set forth.

2. An improved farm-gate having an elliptical wheel or hoop secured thereto with its shortest axis equal at least to the height of the gate and with its longest axis at right angles to said gate, whereby in operation the gate will rotate with said wheel and will automatically remain closed, substantially as set forth.

3. An improved farm-gate provided with a wheel at one end of a diameter at least equal to the height of the gate, and a hinge at the other end capable of universal movement, substantially as set forth.

4. An improved farm-gate provided with a wheel at one end equal at least to the height of the gate, with a hinge at the other end capable of universal movement, and with means for automatically maintaining the gate in its closed position, substantially as set forth.

This specification signed and witnessed this 17th day of September, 1897.

SYLVESTER GEORGE STEVENS.

Witnesses:
J. R. PEACOCK,
BESSIE L. PEACOCK.